W. LEWIS.
SAFETY DEVICE FOR AEROPLANES.
APPLICATION FILED OCT. 9, 1911.
1,024,407.
Patented Apr. 23, 1912.
3 SHEETS—SHEET 1.
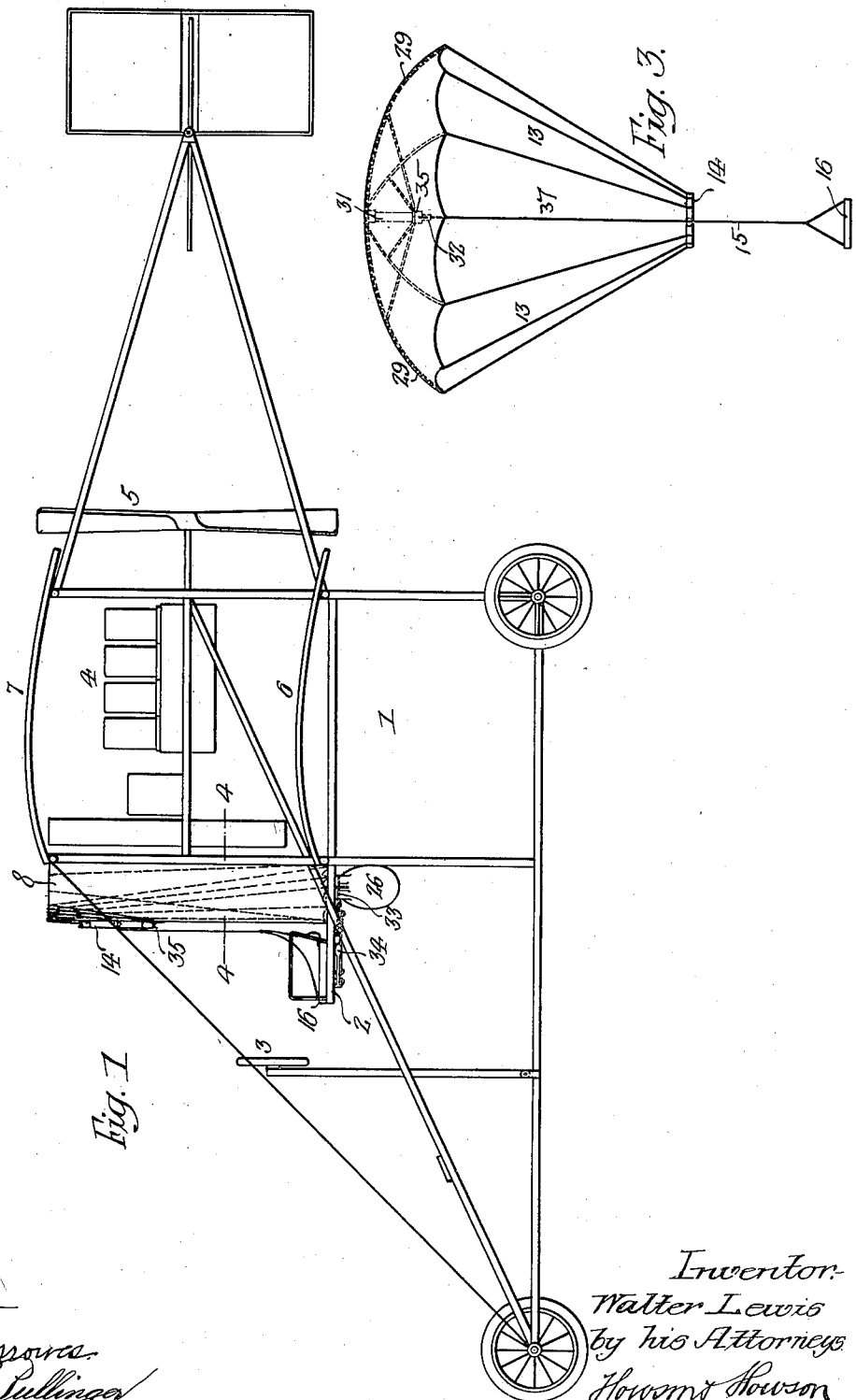

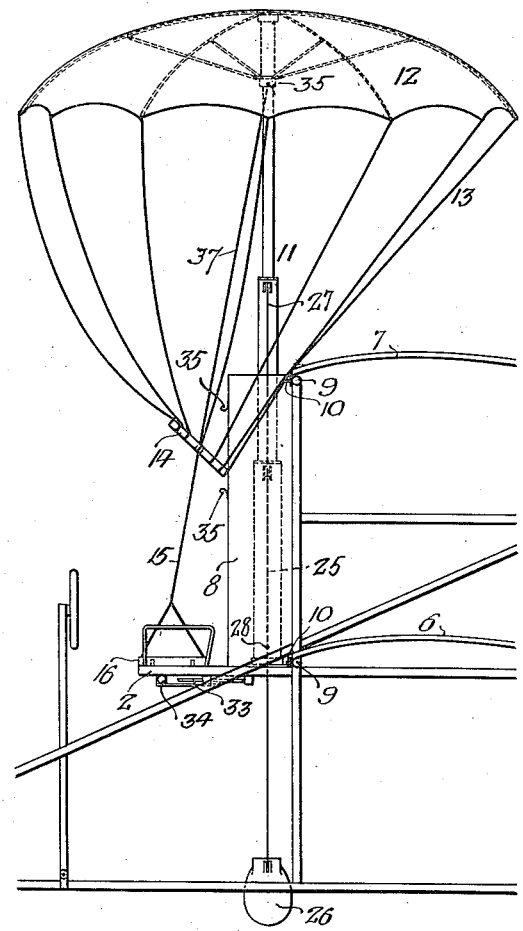
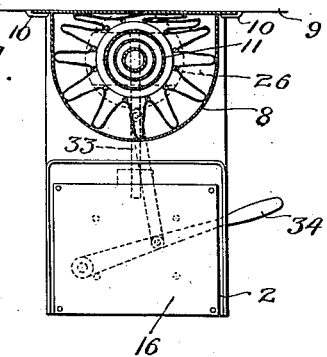
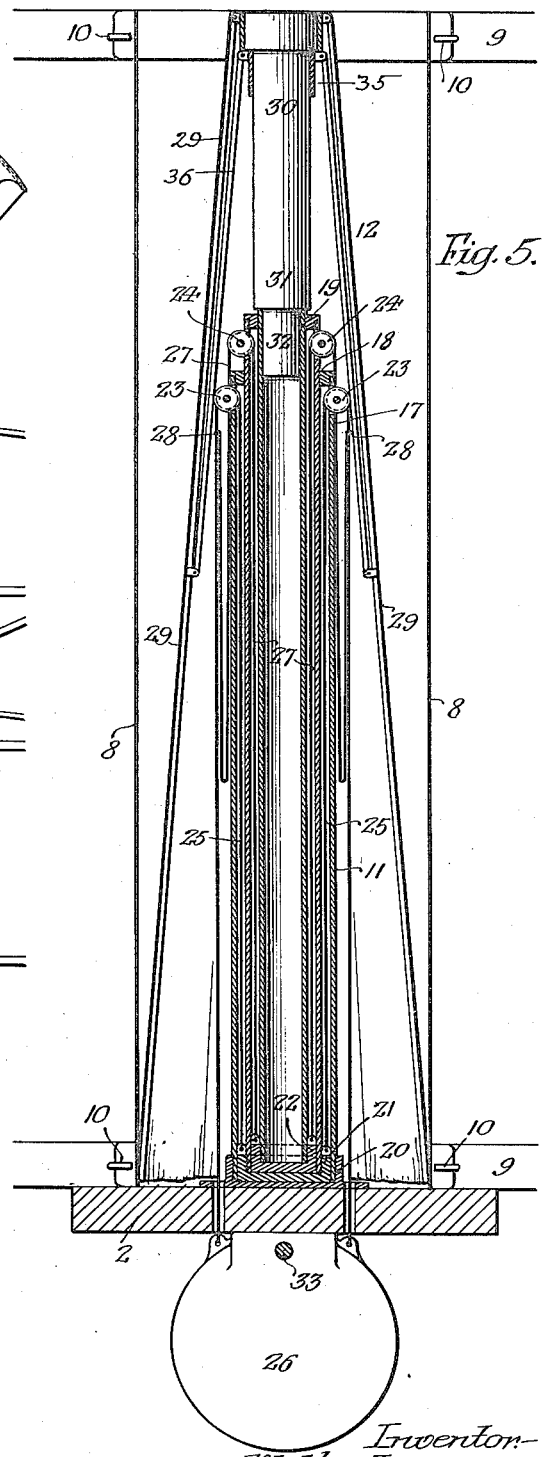

W. LEWIS.
SAFETY DEVICE FOR AEROPLANES.
APPLICATION FILED OCT. 9, 1911.

1,024,407.

Patented Apr. 23, 1912.
3 SHEETS—SHEET 3.

Witnesses:—

Inventor—
Walter Lewis.
by his Attorneys—
Howson & Howson

UNITED STATES PATENT OFFICE.

WALTER LEWIS, OF PHILADELPHIA, PENNSYLVANIA.

SAFETY DEVICE FOR AEROPLANES.

1,024,407. Specification of Letters Patent. Patented Apr. 23, 1912.

Application filed October 9, 1911. Serial No. 653,563.

*To all whom it may concern:*

Be it known that I, WALTER LEWIS, a citizen of the United States, residing in Philadelphia, Pennsylvania, have invented certain Improvements in Safety Devices for Aeroplanes, of which the following is a specification.

My invention relates to certain improvements in parachute safety devices especially adapted to be carried by an aeroplane.

One object of the invention is to provide a device of the parachute type, which can be attached to an aeroplane and which can be readily detached in the case of an accident, so that the parachute will free itself from the aeroplane and carry the aviator, allowing him to descend in safety.

A further object of the invention is to so construct the parachute that it will open when the runner is drawn down, due to the weight of the aviator, and after it has been projected.

Figure 7:
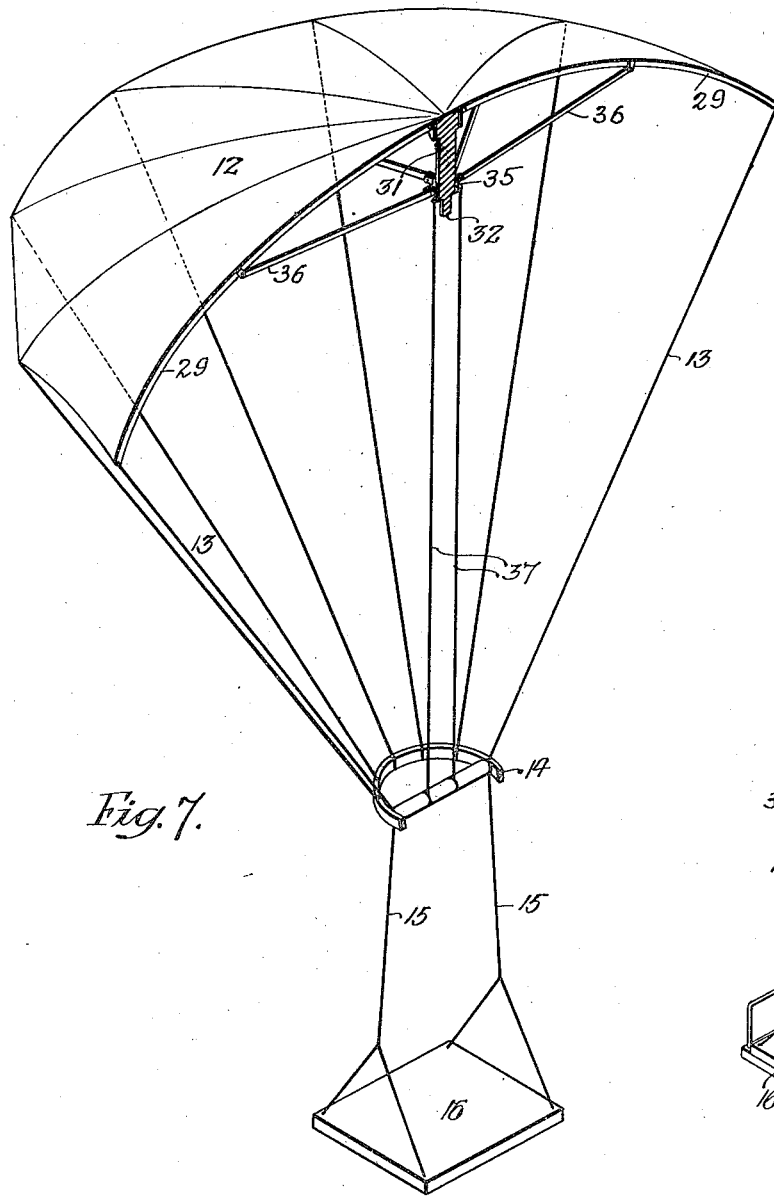
Figure 6:
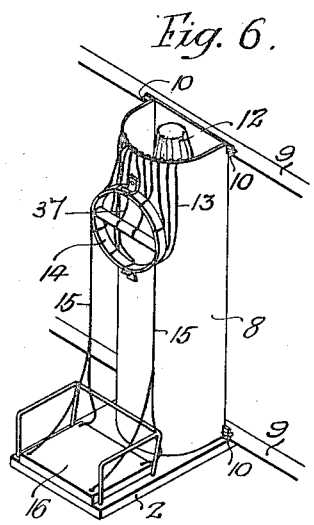

In the accompanying drawings:—Figure 1, is a side view of an aeroplane showing my improved safety device attached thereto and collapsed; Fig. 2, is a view of a portion of an aeroplane showing the parachute released and ready to carry the aviator away from the aeroplane; Fig. 3, is a view of the parachute entirely detached from the aeroplane; Fig. 4, is a sectional plan view on the line 4—4, Fig. 1; Fig. 5, is an enlarged sectional view through the parachute and the casing, showing it in the collapsed position; Fig. 6, is a perspective view, showing the parachute casing and seat; and Fig. 7, is a sectional perspective view of the parachute.

My invention may be either made as an independent article of manufacture, which can be sold and attached to an aeroplane of any type, or can be built to form part of the aeroplane. The parachute portion, however, in either case, when released, being entirely independent of the aeroplane.

1 is an aeroplane of the ordinary type having an aviator's seat 2 and steering wheel 3.

4 is the engine and 5 is the propeller.

6 and 7 are the planes.

8 is a casing which is secured to the frame 9 by clips 10 of any suitable type, so as to secure the casing to the frame. The casing is preferably made detachable, so that the parachute can be purchased independently of the aeroplane and placed in position back of the aviator's seat 2, or at any other convenient point. Mounted within this casing is a telescopic projector 11 which carries the parachute 12, and connected by cords 13 to the parachute, as indicated in Figs. 2 and 3, is a ring 14, and connected to this ring by cords 15 is a seat 16 which is located on the seat 2 of the aeroplane. The aviator occupies this seat when operating the mechanism of the aeroplane. The ribs 29 of the parachute are pivoted to the upper portion of a stem 31, which has a reduced end arranged to enter the end of one of the tubes of the ejector. Arranged to slide on the stem is a runner 35 connected to the ribs by rods 36. When the runner is drawn down it will force the ribs out and thus open the parachute. This runner 35 is connected by cords 37 to the cross bar of the ring 14, as clearly shown in Fig. 7.

When the parachute is projected from its casing the weight of the aviator on the seat will immediately cause the parachute to open, due to the runner 35 being connected by the cords 37 to the ring 14 and the ring to the seat by the cords 15. The ejecting mechanism is released by manipulating a bolt or other fastening, and the aviator leaves the aeroplane without having to move from his seat in the event of an accident.

I preferably construct the mechanism for releasing the parachute in the following manner:—The telescopic section 11 consists, in the present instance, of three tubes 17, 18 and 19, and these tubes telescope one within the other; the outer tube being attached to a base plate 20 secured to the seat board 2 and the intermediate tube 18 is attached to a cap plate 21, while the inner tube 19 is attached to a cap plate 22. At the upper end of the tube 17 are rope sheaves 23, and at the upper end of the intermediate tube 18 are rope sheaves 24. Ropes 25 are attached to the cap plate 21 of the intermediate tube and pass around the rope sheaves 23 down through the seat board 2 of the aeroplane and are attached to a weight 26 under said board, and ropes 27 are attached to the inner cap plate 22, pass around the sheaves 24 and are attached to the ropes 25 at 28. As soon as the weight 26 is released it will drop, causing the ropes 25 to project the intermediate tube 18 out of the fixed tube 17, and as soon as the slack on the rope 27 is taken up the inner tube 19 will be projected out of the intermediate tube 18, and as the parachute is located upon the inner tube it will be projected out of its casing and will immediately open, as described above and as indicated in Fig. 2. In order to release the weight I provide, in the present instance, a bolt 33 which is carried by the seat board 2 and enters an opening in the weight, as indicated in Fig. 5, and this bolt is attached to a pivoted lever 34 within easy reach of one hand of the operator. When it is desired to open and detach the parachute from the aeroplane, all that is necessary is to move the lever and thus withdraw the bolt, when the weight will fall, the parachute will be projected, and the aviator then grasps the ring 14 so as to steady himself on the seat 16 of the parachute as the parachute leaves the aeroplane. The ring is preferably held against the casing 8 by spring clips 35 of any suitable type, so that it can be readily released, and any suitable device may be used to retain the seat of the parachute in position on the seat board of the aeroplane. Thus it will be seen that I construct a very simple and effective safety device, which can be made separate from an aeroplane and which can be attached to any type of aeroplane, preferably directly back of the aviator's seat, although the particular location of the safety device will depend considerably upon the type of aeroplane to which the invention is applied.

While my invention is particularly adapted for use in aeroplanes of the type illustrated in the drawings, it will be understood that it can be used in any aviating mechanism, either of this particular type or of the balloon type without departing from the essential features of the invention, but the invention is particularly adapted for use in aeroplanes as indicated above.

It will be noticed that in my improved parachute, the runner is drawn down to open the parachute, which is opposite to the ordinary method of opening an umbrella, and as this runner is attached to the cords which lead to the seat, the weight of the aviator automatically acts to open the parachute when the said parachute is projected from the casing by the telescopic ejecting mechanism. Thus avoiding the use of any springs or other complicated mechanism to open the parachute after it is ejected, and I do not rely on the inflation of the parachute by the air alone, but make the opening positive by the above described construction.

I claim:—

1. The combination of an aeroplane; a parachute safety device consisting of a tube secured to the aeroplane and having a telescopic projecting device; a weight attached to the said telescopic device; a parachute resting upon the telescopic device but otherwise free therefrom; and cords leading from the parachute in position to be used by the aviator when necessary to descend independently of the aeroplane.

2. The combination of an aeroplane having an aviator's seat; a tubular casing located near said seat; a series of tubes within the casing, one telescoping within the other; cords attached to the tubes; a weight suspended from the cords; a parachute having a stem located on the inner telescopic tube; rope sheaves on two of said tubes; ropes passing around the sheaves and attached to the inner and the intermediate tubes; a weight to which the lower ends of the ropes are attached; means at the aviator's seat for retaining the weight in inoperative position; and cords leading from the parachute outside of the tube and in position to be used by the aviator when the bolt is withdrawn to release the weight.

3. The combination of an aeroplane having a seat for the aviator; a casing back of the seat; a series of telescopic tubes located in the casing; cords attached to the tubes and to a weight; a bolt for retaining the weight in inoperative position; a parachute having a stem carried by the telescopic projecting means; cords leading from the parachute outside of the casing; a ring to which the cords are attached; and a seat section connected to the ring and occupying a position above the seat of the aeroplane.

4. A detachable safety device for aeroplanes, consisting of a casing arranged to be attached to the aeroplane; a telescopic projecting device located within the casing; a weight for projecting the said device; means for retaining the weight in inoperative position; a parachute mounted within the tube and having a stem located above the telescopic device; and a ring and seat section connected to the parachute so that when the weight is released it will project the parachute which will detach itself from the aeroplane.

5. A parachute having a stem; ribs pivotally mounted at the upper end of the stem; a runner mounted on the stem; brace rods connecting the runner with the ribs; and means adapted to carry the aviator secured to the runner, so that when the parachute is ejected the runner will be drawn away from the pivot of the ribs, thus opening the parachute by the weight of the aviator.

In testimony whereof, I have signed my name to this specification, in the presence of two subscribing witnesses.

WALTER LEWIS.

Witnesses:
Wm. E. Shupe,
Wm. A. Barr.